(12) United States Patent
Krikorian et al.

(10) Patent No.: US 7,973,699 B2
(45) Date of Patent: Jul. 5, 2011

(54) DISMOUNT HARMONIC ACCELERATION MATCHED FILTERING FOR ENHANCED DETECTION AND DISCRIMINATION

(76) Inventors: Kapriel Krikorian, Calabasas, CA (US); Robert Rosen, Agoura Hills, CA (US); Mary Krikorian, Calabasas, CA (US)

( * ) Notice: Subject to any disclaimer, the term of this patent is extended or adjusted under 35 U.S.C. 154(b) by 127 days.

(21) Appl. No.: 12/416,073

(22) Filed: Mar. 31, 2009

(65) Prior Publication Data

US 2010/0245152 A1    Sep. 30, 2010

(51) Int. Cl.
*G01S 13/524* (2006.01)
(52) U.S. Cl. .............. 342/28; 342/90; 342/193
(58) Field of Classification Search ........... 342/28, 342/90
See application file for complete search history.

(56) References Cited

U.S. PATENT DOCUMENTS

| | | | | |
|---|---|---|---|---|
| 3,983,558 A | * | 9/1976 | Rittenbach | 342/160 |
| 5,113,194 A | * | 5/1992 | Krikorian et al. | 342/106 |
| 5,381,154 A | * | 1/1995 | Guerci | 342/90 |
| 5,565,872 A | * | 10/1996 | Prevatt et al. | 342/193 |
| 5,784,026 A | * | 7/1998 | Smith et al. | 342/160 |
| 6,661,345 B1 | * | 12/2003 | Bevan et al. | 340/575 |
| 6,922,145 B2 | * | 7/2005 | Piesinger | 340/541 |
| 6,943,724 B1 | * | 9/2005 | Brace et al. | 342/25 B |
| 7,382,310 B1 | * | 6/2008 | Piesinger | 342/28 |
| 7,535,412 B1 | * | 5/2009 | Blunt et al. | 342/179 |
| 2003/0164792 A1 | | 9/2003 | Jahangir et al. | |
| 2005/0018925 A1 | | 1/2005 | Bhagavatula et al. | |

OTHER PUBLICATIONS

Geisheimer, J.L.; Marshall, W.S.; Greneker, E.;, "A continuous-wave (CW) radar for gait analysis," Conference Record of the Thirty-Fifth Asilomar Conference on Signals, Systems and Computers. Nov. 2001. vol. 1. pp. 834-838.*
Hersey, R.K.; Melvin, W.L.; Culpepper, E. "Dismount modeling and detection from small aperture moving radar platforms," RADAR '08 IEEE Radar Conference. May 2008. pp. 1-6.*
Otero, Michael. "Application of a continuous wave radar for human gait recognition," Proceedings of the SPIE Signal Processing, Sensor Fusion, and Target Recognition XIV. 2005. col. 5809, pp. 538-548.*

* cited by examiner

*Primary Examiner* — Thomas H Tarcza
*Assistant Examiner* — Matthew M Barker

(57) ABSTRACT

A process for detecting the harmonic motion characterizing a desired target. An exemplary method includes generating a radar image of the target utilizing a pulse doppler radar. A plurality of matched filter signals are generated in the receiver, each matched filter signal corresponding to a doppler profile of harmonic acceleration for the desired target. The matched filter signals are generated by an array of matched filters, with each matched filter signal corresponding to a predetermined doppler profile. The received radar image is then correlated to the matched filter signals to detect the desired target.

14 Claims, 2 Drawing Sheets

DISMOUNT HARMONIC ACCELERATION MATCHED FILTERING FOR ENHANCED DETECTION AND DISCRIMINATION

BACKGROUND OF THE INVENTION

Conventional pulse doppler radar systems radiate a coherent pulse train that, when reflected by a scatterer, returns signals that can provide data including the range (the distance from the antenna) and the range rate (the radial velocity away from the antenna) of the scatterer. A wide range of pulse doppler radar systems have been used in the prior art, with applications including airborne or surface-based antennas, for surveillance, weapons control and tracking, and meteorological observation, among others. In general, pulse doppler radar systems are used where moving targets are desired to be detected amidst an environment replete with clutter, or scatterers other than the desired target.

Due to rapid advances in digital signal processing (DSP) technology, many modern radar systems, including pulse doppler radar systems, digitize the return signals and utilize DSP for target detection and discrimination. DSP technology can improve the performance of a radar system while reducing its cost. Furthermore, the flexibility allowed by DSP systems can improve signal detection by enabling real-time adaptation of the receiver to various conditions.

However, radar detection of slow-moving targets such as walking humans (known in the field as dismounts) is significantly degraded by clutter. Thus, conventional systems typically are poor detectors of dismounts.

SUMMARY

The present invention provides for a process for detecting the harmonic motion that characterizes a particular target. In one aspect, the invention provides a method including generating a radar image of the target, generating a plurality of matched filter signals corresponding to a doppler profile of harmonic acceleration for a desired target, and correlating the radar image to the matched filter signal. The plurality of matched filter signals may be adapted to represent a range of doppler profiles of a corresponding range of desired targets. Further, the matched filter signals may be generated by an array of matched filters, with each matched filter signal corresponding to a predetermined doppler profile. The array may represent the range of doppler profiles by representing discrete values of variables of motion of the desired targets.

In a further embodiment, the matched filter signals include a harmonic acceleration compensation voltage $vh_{k,j}$ having a harmonic acceleration compensation phase angle $\phi h_{k,j}$, wherein $\phi h_{k,j}$ is a function of the variables of motion of the desired target. In this embodiment, $vh_{k,j} = e^{-i \cdot \phi h_{k,j}}$, and $$\varphi h_{k,j} = 4 \cdot \frac{\pi}{\lambda} \cdot rdot \cdot \sin\left[\frac{2 \cdot \pi}{Tstep} \cdot (k + N \cdot j) \cdot \frac{Ta}{N} + \varphi q\right].$$

Here, $\lambda$ is a radar wavelength; rdot is a range rate; Tstep is a period between footsteps; k is a time sample index; N is a number of time samples per coherent array; j is a coherent array index; Ta is a coherent array time; m is a phase angle scaling factor based on scatterer location on the leg/arm; and $\phi q$ is a phase quantization of harmonic acceleration levels. The range of doppler profiles may be adapted to represent dismounts across a range of at least one of the variables of motion Tstep, Rdot, or $\phi q$.

These and other aspects of the invention are more fully comprehended upon review of this disclosure.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
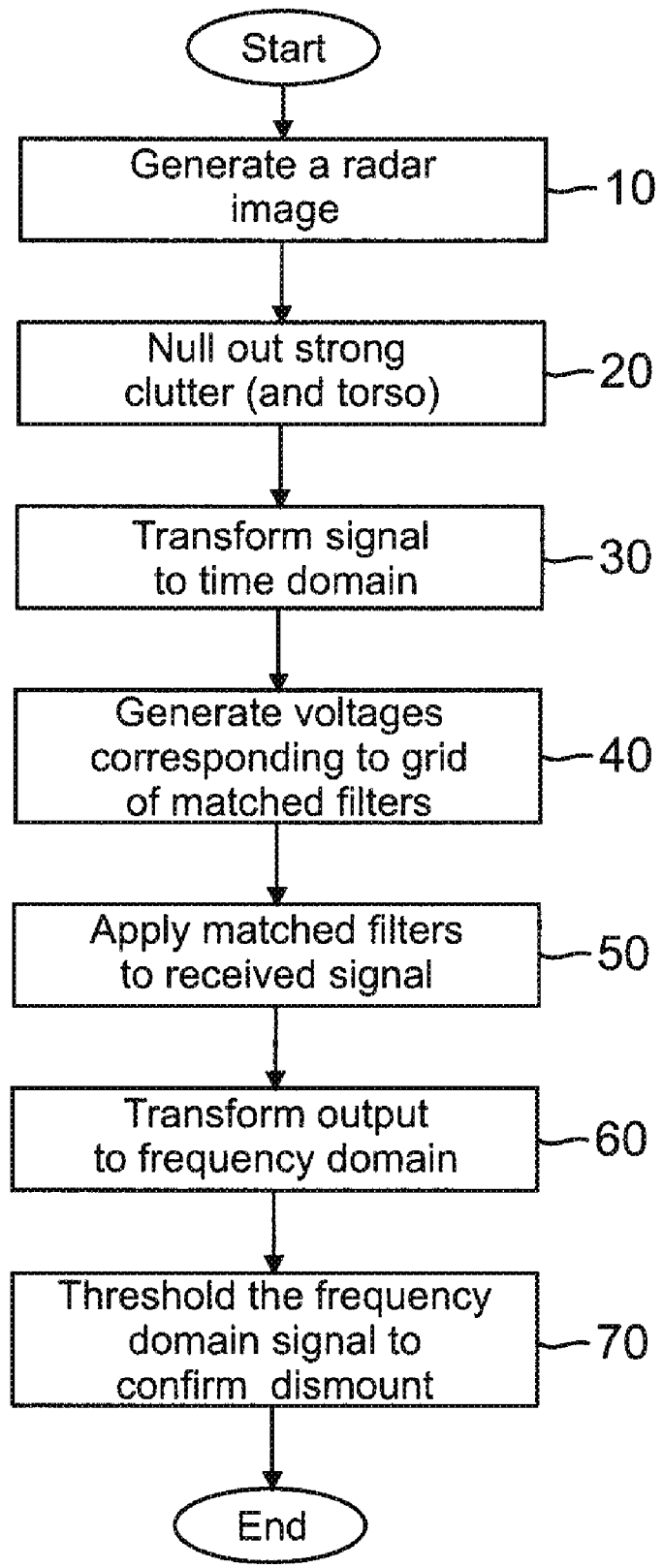
FIG. 1 is a flow chart illustrating a process according to an exemplary embodiment.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

The walking and/or running motion of the legs and arms of the human body is generally periodic, resembling the harmonic motion of a pendulum. One aspect of an exemplary embodiment of the present invention enables the detection of the presence of this human motion and the discrimination of particular individuals amidst other individuals in the proximity.

While the following detailed description frequently utilizes the term "dismount," which generally refers to a human who is walking, running, or otherwise not aboard a vehicle, various embodiments of the present invention are not limited thereto. In fact, some embodiments enable the detection and discrimination of any radar scatterer that exhibits harmonic motions having distinct and/or unique characteristics. Thus, one skilled in the art will comprehend that the use of the term dismount in regard to a number of embodiments is not intended to limit the disclosure in any way.

Figure 2:
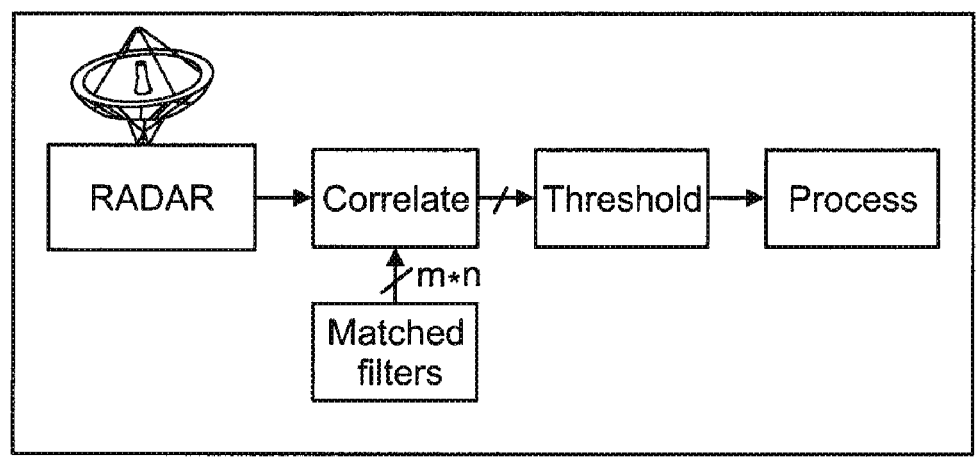
FIG. 2 is a block diagram illustrating a system for carrying out the process according to the exemplary embodiment.

FIG. 1 is a flow diagram of a process for detecting a dismount utilizing a pulse doppler radar according to an exemplary embodiment of the present invention. In some embodiments the process is performed by hardware such as a digital signal processor (DSP), a microprocessor, or an application specific integrated circuit. In some embodiments the process is performed by software. In some embodiments the process is performed by the system of FIG. 2.

In block 10 the process generates a radar image. In some embodiments the process generates a radar image utilizing a conventional pulse doppler radar, including transmitting a coherent pulse train and receiving a return signal from one or more scatterers. In some embodiments the process performs various sub-processes on the return signal such as low noise amplification, mixing with a local oscillator, and analog to digital conversion, including transforming the received signal to the frequency domain with a fast Fourier transform (FFT). In some embodiments, if there is no signal detected having a range rate within a certain window, such as a window suitably determined to contain slow-moving targets like dismounts, the process ends.

In block 20 the process nulls out portions of the signal including strong clutter, and in some embodiments, nulls out portions of the signal including the torso of the dismount. In some embodiments, the zeroing of these undesired portions of the radar image is accomplished with conventional notch filters, or filters with a stop band in regions of the clutter and/or the torso. In some embodiments, the zeroing is performed only in range bins that contain slow movers. Range bins correspond to discrete ranges of the measured range rate of the target. Because it is known that a dismount is a relatively slow mover, processing can be reduced by limiting it to the range bins that contain slow movers.

In block 30 the process transforms the signal to the time domain. In some embodiments, this transformation is accomplished by an inverse FFT. In some embodiments, the inverse FFT is performed only for the range bins containing the slow movers.

In block 40 the process generates voltages corresponding to an array of matched filters. In some embodiments, each matched filter is configured to synthesize a signal corresponding to the doppler profile of harmonic acceleration for a particular walking person. Such a profile might be obtained based on empirical measurement of one or more individuals or it might be purely synthetic based on a theoretical model of the characteristics of walking humans. In some embodiments, the profiles may be a combination of empirical and theoretical models. In any case, the array corresponds to a grid or matrix of matched filters with each matched filter utilizing a particular value for one or more variables in a suitable range of harmonic acceleration patterns of humans.

Figure 3:
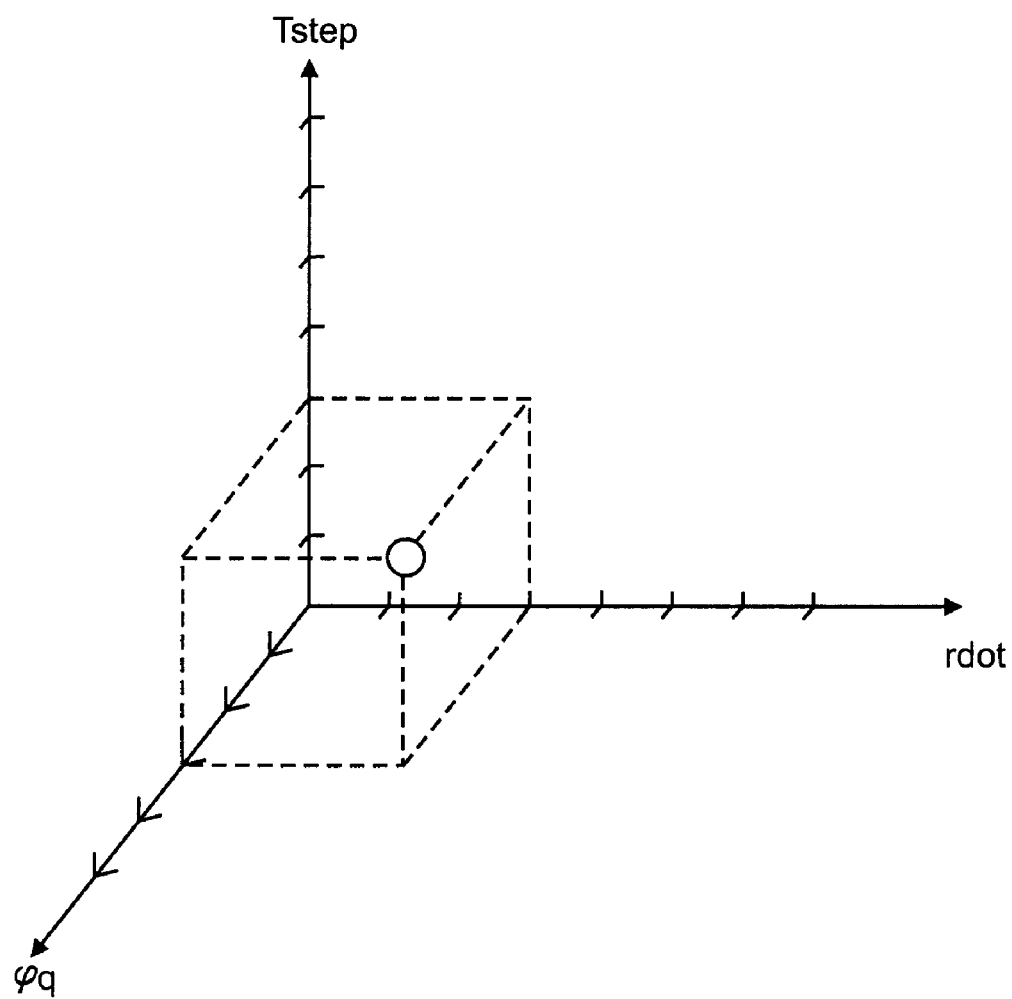
FIG. 3 is a chart schematically illustrating ranges of three variables of motion.

For example, the matched filters of one exemplary embodiment may be illustrated as the three-dimensional grid of FIG. 3, such that, in a first dimension, the step period Tstep of the dismount is varied; in a second dimension, the phase quantization φq is varied; and in a third dimension, the range rate of the dismount is varied. For ease of description, only one coordinate is illustrated; however, according to various exemplary embodiments, a plurality of matched filters may be used, each at a different coordinate.

Each of these variables is varied across a suitable range of values at suitable discrete intervals in each dimension. In some embodiments, the range of each variable is predetermined according to the predicted variability of that variable in the harmonic motion of dismounts. In some embodiments, the interval between the values of adjacent matched filters in any dimension is constant, and in other embodiments the interval varies across the range of values. One skilled in the art will comprehend that the range and the interval of the variables may be limited in some embodiments based on the availability of hardware and/or computing resources.

In block 50, the signals output by the matched filters are applied to the received signal. In some embodiments, application of the matched filter outputs includes multiplying the received signal with the signal output by each matched filter as described above. In some embodiments, application of the matched filters includes calculating the correlation between the matched filter outputs and the received signal. Thus, if the received signal correlates with the profile of at least one of the matched filters, the resultant output may indicate the presence of a dismount matching the profile of that particular matched filter.

In block 60, the resultant output from the application of the matched filters to the received signal is transformed to the frequency domain. In some embodiments, transformation to the frequency domain is achieved with a fast Fourier transform (FFT).

In block 70, the frequency domain signal is thresholded to confirm the presence of a dismount. In some embodiments, the resultant output from the correlation between each of the matched filters and the received signal, after transforming to the frequency domain, is compared to a threshold, and if it exceeds the threshold, the system indicates that a dismount matching that particular profile has been detected.

A matched filter according to an exemplary embodiment of the present invention will now be described in further detail. The use of a matched filter in a dismount detecting radar enhances the detection of human legs, arms, and other harmonic oscillators by increasing the signal to interference ratio of the desired signals. That is, a system utilizing matched filters according to an exemplary embodiment of the present invention is capable of detecting special particular attributes of each human's walking or running characteristics to improve discrimination among humans and enhanced probability of track association in dense urban environments.

A grid of matched harmonic acceleration filters can be generated for different phase quantization levels, step times, and accelerations per range bin. As such, in an exemplary embodiment, each matched filter corresponds to the profile of harmonic acceleration for a particular category of walking persons. If a particular person starts walking faster, for example, the return signal would have different magnitudes and different phases. In this case, with a suitable grid of matched filters, a different matched filter would correlate with the return signal after the change in walking speed. The number of matched filters can vary based on the desired sensitivity to changes in the equation, and on the range that each of the variables spans.

The quantization of particular variables should be small enough such that likely variations do not cause the signal to be lost. For example, the step period Tstep for a matched filter may be quantized at 0.2 second intervals, such that a strong peak occurs with a walking man with a step period of 0.4 seconds and at 0.6 seconds. However, if the step period is actually 0.5 seconds, that is, between two quantization levels, this condition may result in signal loss. Simulation results or empirical studies such as these can be utilized to determine suitable quantization levels.

According to an exemplary embodiment of the present invention, the harmonic acceleration compensation phase angle $\varphi h_{k,j}$ is given by:

$$\varphi h_{k,j} := 4 \cdot \frac{\pi}{\lambda} \cdot rdot \cdot \sin\left[\frac{2 \cdot \pi}{Tstep} \cdot (k + N \cdot j) \cdot \frac{Ta}{N} + \varphi q\right]. \quad \text{EQ. 1}$$

In equation 1, $\lambda$ is the radar wavelength; rdot is the range rate; Tstep is the period between footsteps of the walking/running man; k is the time sample index; N is the number of time samples per coherent array; j is the coherent array index; Ta is the coherent array time; m is a phase angle scaling factor based on scatterer location on the leg/arm; and φq is the phase quantization of harmonic acceleration levels for acceptable harmonic compression levels.

The radar wavelength $\lambda$ is not limited to any particular band, and any suitable wavelength may be used according to a particular application. However, some embodiments utilize the Ka band (i.e., 26.5-40 GHz), the X band (i.e., 8-12 GHz), or the S band (i.e., 2-4 GHz).

The range rate of the target rdot is generally defined as the radial velocity of the target away from the radar antenna. Among the grid of matched filters, in some embodiments the range rate rdot is a variable quantity across one dimension of the grid, with a suitable range to cover potential velocities of walking or running humans.

In some embodiments, the period between footsteps of the walking/running man Tstep is a variable, varied across one dimension of the grid of matched filters. The period Tstep may span from relatively slow for a casual stroll to relatively fast for a sprint, and varies depending on an individual's gait.

The time sample index k is a label assigned to each time sample in the array. The number of time samples per coherent array is represented by N.

The coherent array index j indicates the index of the coherent array, as some embodiments utilize a plurality of coherent arrays. In some embodiments, a single, short dwell, such as for half a second, is enough time to extract harmonic acceleration of a dismount. In embodiments utilizing a lower frequency band, a single coherent array for a half a second is sufficient. In other embodiments, where longer dwell times are desired, or where higher frequency bands and arrays having shorter dwell times are utilized, multiple arrays may be coherently combined. In some embodiments relatively long dwell times are used wherein the detection of very small harmonic movements, such as the chest motion from a breathing man, or even the small movements from a man's pulse, is desired. In these embodiments, multiple arrays are coherently combined into a long coherent array of for example ten seconds.

Thus, in some embodiments, the correlation signal output from a particular active filter among the grid of active filters is coherently combined over a series of the shorter dwells. In some embodiments, the long coherent array is obtained by coherently combining the short coherent arrays with a 50% overlap, thus reducing possible doppler ambiguities. In this way, the doppler filter is split up into a finer resolution doppler filter. This achieves a much finer doppler resolution, enabling the detection of very small motion.

In other embodiments, shorter arrays are utilized to detect larger-scale harmonic motion, such as walking. However, if a walking man is not detected, many arrays can be combined over coherently, for example, five or ten seconds, enabling a very fine doppler resolution capable of seeing very small doppler motion like the motion of the chest. Thus, in some embodiments, shorter arrays can be used to detect steps, but a series of those shorter arrays, combined coherently, can enable the detection of chest motion indicative of breathing.

In various embodiments, a relatively limited amount of processing could be used to create an alert to indicate the detection of a target, without requiring phase information. For example, this detection can be accomplished utilizing m out of n logic, or post-detection integration (PDI). With these embodiments, after a detection of a target is achieved, the system can reprocess the data in more detail, for example, with the phase information, to more fully determine whether the detected target is a walking man.

With m out of n logic, m represents a number of coherent arrays, and n represents a number of those arrays in which a target is detected. In this embodiment, if n is above a threshold, e.g., a predetermined threshold, the system determines that a person is moving.

With PDI, a non-coherent integration of a series of arrays from one filter is performed, and its output is thresholded. If the output is above a threshold, e.g., a predetermined threshold, the system determines that a person is moving.

Returning to equation 1, the coherent array time Ta is the dwell time as already discussed above.

The phase angle scaling factor m is based on scatterer location on the leg/arm. There are several oscillators in a dismount at different points within the body, such as along the leg. Thus, the return signals from several of these scatterers are superposed in the return signal.

For example, on a person's leg, the knee, the foot, and other positions are discrete scatterers. During a typical walking motion, scatterers on the knee will undergo a smaller amplitude of oscillation, and the instantaneous phase of the return signal is proportional to that amplitude. Therefore, a scatterer with a smaller amplitude of motion will result in a smaller variation in phase of the return signal. In this way, the phase angle scaling factor m is utilized to indicate the magnitude of the oscillation, where the magnitude is dependent on the location of the scatterer.

If there are return signals from those particular scatterers, then the particular matched filter corresponding to those scatterers will correlate with the received signal. Multiple scatterers are utilized to reduce or avoid the problem of mismatches that can hurt the detection of harmonic motion of a particular discrete scatterer. Thus, some embodiments of the grid of matched filters include variations in the phase angle scaling factor m in one dimension.

Finally, $\phi q$ represents the phase quantization of harmonic acceleration levels for acceptable harmonic compression levels. These variables in combination as in equation 1 give the phase angle $\phi h_{k,j}$ of the harmonic acceleration compensation filters, or the matched filters of an exemplary embodiment of the present invention. Thus, the harmonic acceleration compensation voltage $vh_{k,j}$ output by the matched filters for multiplying the radar voltage returns, is given by equation 2.

$$vh_{k,j} = e^{-i \cdot \phi h_{k,j}} \qquad \text{EQ. 2}$$

In equation 2, e is the exponential, and i is the unit imaginary number.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. For example, the process may be performed by dedicated hardware such as an ASIC or DSP; custom-configured hardware such as an FPGA; or by software executed by a microprocessor. Additionally, various types of radar may be utilized such as a pulse radar, a continuous wave radar, a moving target indicator, a tracking or an imaging radar, or a guidance radar, among others.

What is claimed is:

1. A method of detecting harmonic motion of a target, comprising:
    generating a radar image of the target;
    generating a plurality of matched filter signals corresponding to a doppler profile of harmonic acceleration for a desired target; and
    correlating the radar image of the target to the matched filter signal to detect the harmonic motion of the target.

2. The method according to claim 1, wherein the plurality of matched filter signals are adapted to represent a range of doppler profiles of a corresponding range of desired targets.

3. The method according to claim 2, wherein generating a plurality of matched filter signals comprises utilizing an array of matched filters, each matched filter being configured to generate a matched filter signal corresponding to a predetermined doppler profile, the array representing the range of doppler profiles by representing discrete values of variables of motion of the desired targets.

4. The method according to claim 3, wherein the desired target comprises a dismount, and the plurality of matched filter signals comprise a harmonic acceleration compensation voltage $vh_{k,j}$ having a harmonic acceleration compensation phase angle $\phi h_{k,j}$, wherein $\phi h_{k,j}$ is a function of the variables of motion of the desired target, such that:

$$vh_{k,j} = e^{-i \cdot \phi h_{k,j}}, \text{ and}$$

$$\varphi h_{k,j} = 4 \cdot \frac{\pi}{\lambda} \cdot rdot \cdot \sin\left[\frac{2 \cdot \pi}{Tstep} \cdot (k + N \cdot j) \cdot \frac{Ta}{N} + \varphi q\right];$$

λ is a radar wavelength;
rdot is a range rate;
Tstep is a period between footsteps;
k is a time sample index;
N is a number of time samples per coherent array;
j is a coherent array index;
Ta is a coherent array time;
m is a phase angle scaling factor based on scatterer location on the leg/arm; and
φq is a phase quantization of harmonic acceleration levels.

5. The method according to claim 4, wherein the range of doppler profiles is adapted to represent dismounts across a range of at least one of the variables of motion Tstep, Rdot, or φq.

6. The method according to claim 5, further comprising transforming the radar image to the time domain prior to correlating the radar image to the matched filter signal.

7. The method according to claim 6, further comprising generating a frequency domain signal by transforming to the frequency domain an output of correlating the radar image to the matched filter signal.

8. The method according to claim 7, further comprising indicating the presence of the dismount when the frequency domain signal is greater than a threshold.

9. The method according to claim 8, wherein generating a radar image comprises measuring a doppler profile of the target by utilizing a pulse doppler radar.

10. The method according to claim 9, further comprising coherently combining a plurality of sequential outputs of the correlation of the radar image to the matched filter signal, for increasing a doppler resolution of the harmonic motion of the dismount.

11. The method according to claim 10, wherein coherently combining the plurality of sequential outputs comprises partially overlapping adjacent ones of the sequential outputs.

12. A method of detecting harmonic motion of a target, comprising:
generating a radar image of the target;
generating a plurality of matched filter signals from a plurality of matched filters, respectively, wherein the plurality of matched filter signals correspond to a doppler profile of harmonic acceleration for a desired target, and wherein the plurality of matched filters comprise a three-dimensional grid such that, in a first dimension, a step period of the target is varied, in a second dimension, a phase quantization is varied, and in a third dimension, a range rate of the target is varied; and
correlating the radar image to the matched filter signal.

13. The method according to claim 12, wherein the plurality of matched filter signals are adapted to represent a range of doppler profiles of a corresponding range of desired targets.

14. The method according to claim 13, wherein generating a plurality of matched filter signals comprises utilizing an array of matched filters, each matched filter being configured to generate a matched filter signal corresponding to a predetermined doppler profile, the array representing the range of doppler profiles by representing discrete values of variables of motion of the desired targets.

* * * * *